Dec. 18, 1934.  J. S. SHARPE  1,985,110
TRANSMISSION MECHANISM
Original Filed Aug. 13, 1932  6 Sheets-Sheet 1
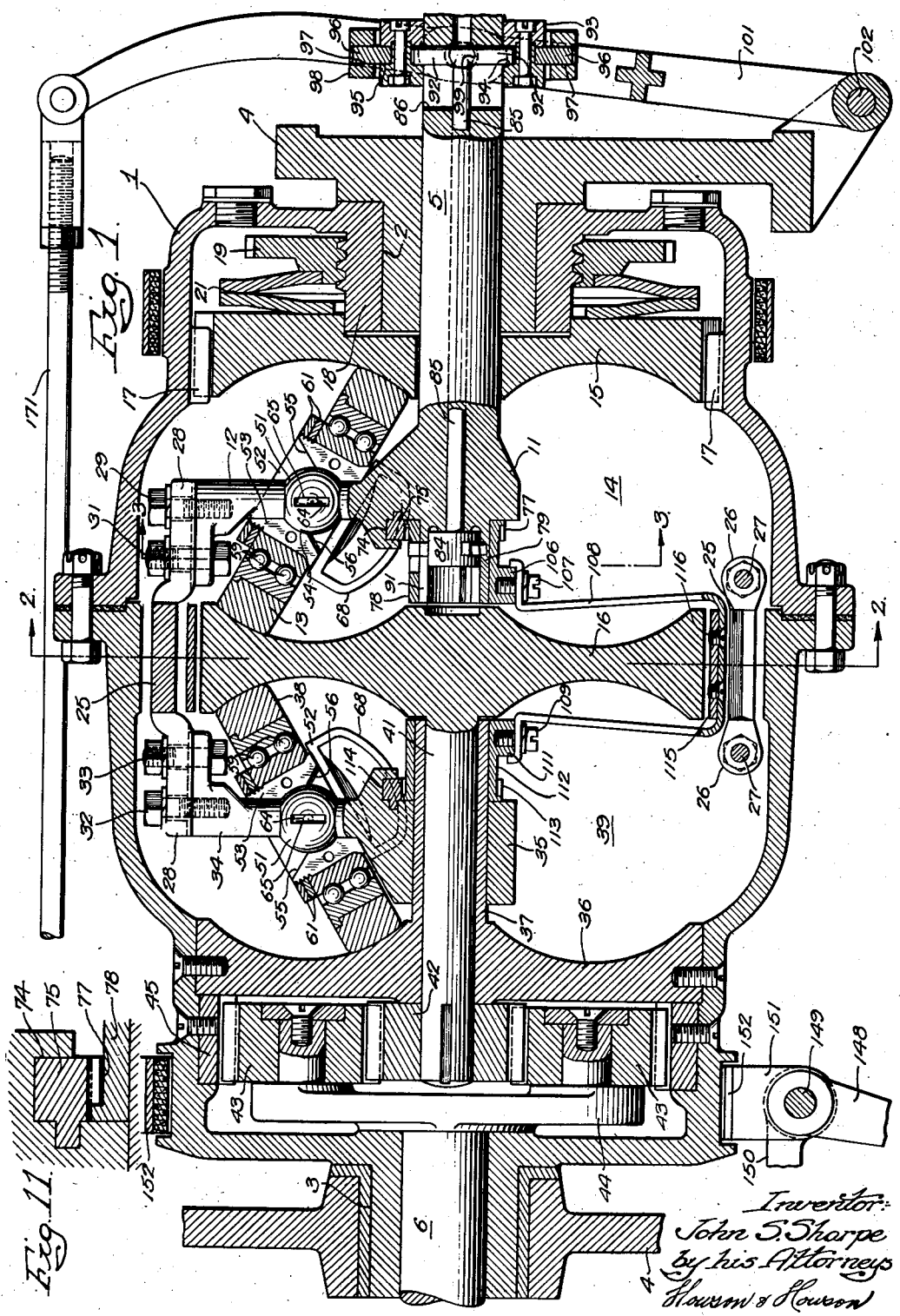
Inventor:
John S. Sharpe
by his Attorneys
Howson & Howson Dec. 18, 1934.  J. S. SHARPE  1,985,110
TRANSMISSION MECHANISM
Original Filed Aug. 13, 1932  6 Sheets-Sheet 2
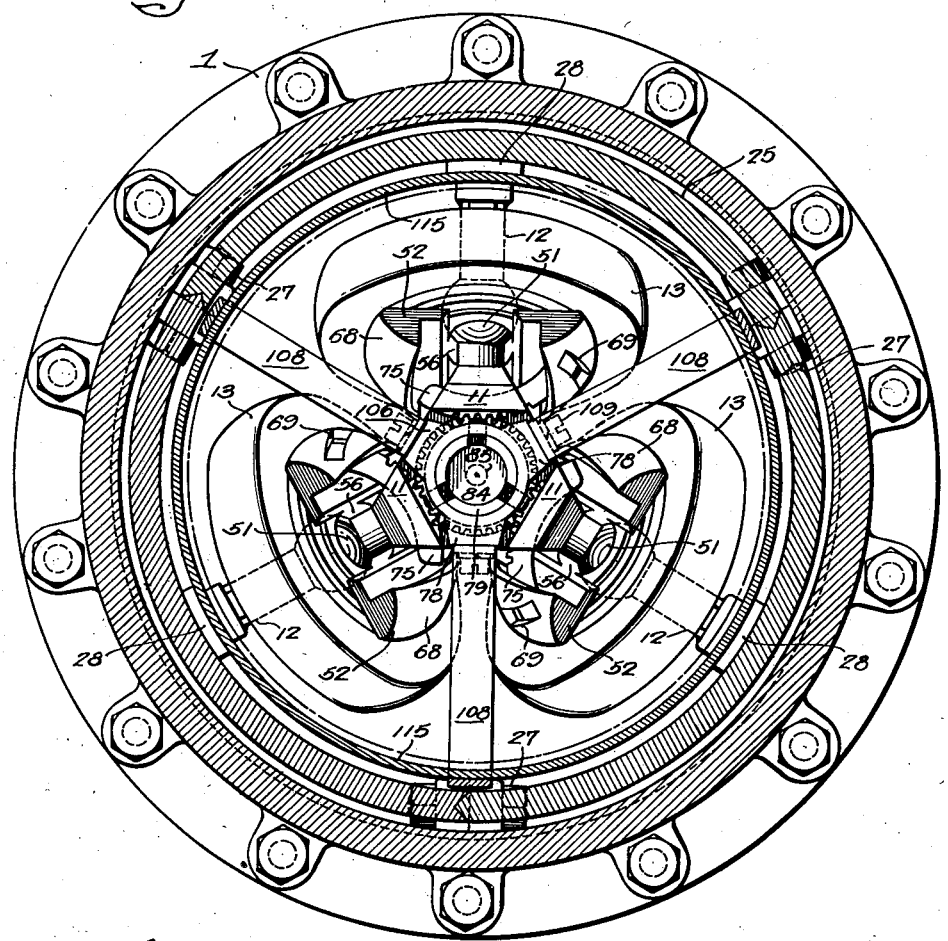
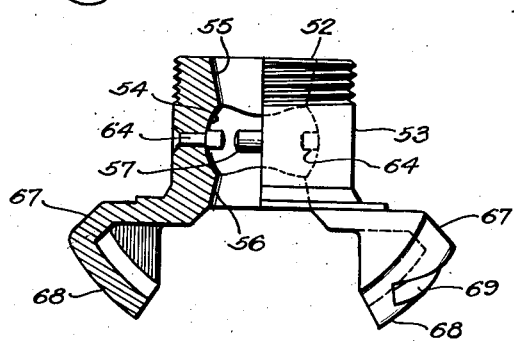
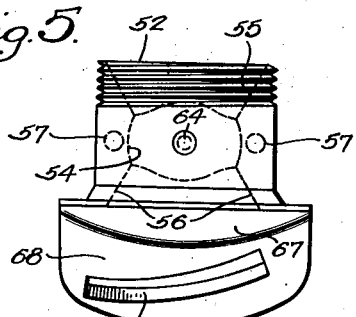

Dec. 18, 1934.  J. S. SHARPE  1,985,110
TRANSMISSION MECHANISM
Original Filed Aug. 13, 1932  6 Sheets-Sheet 3
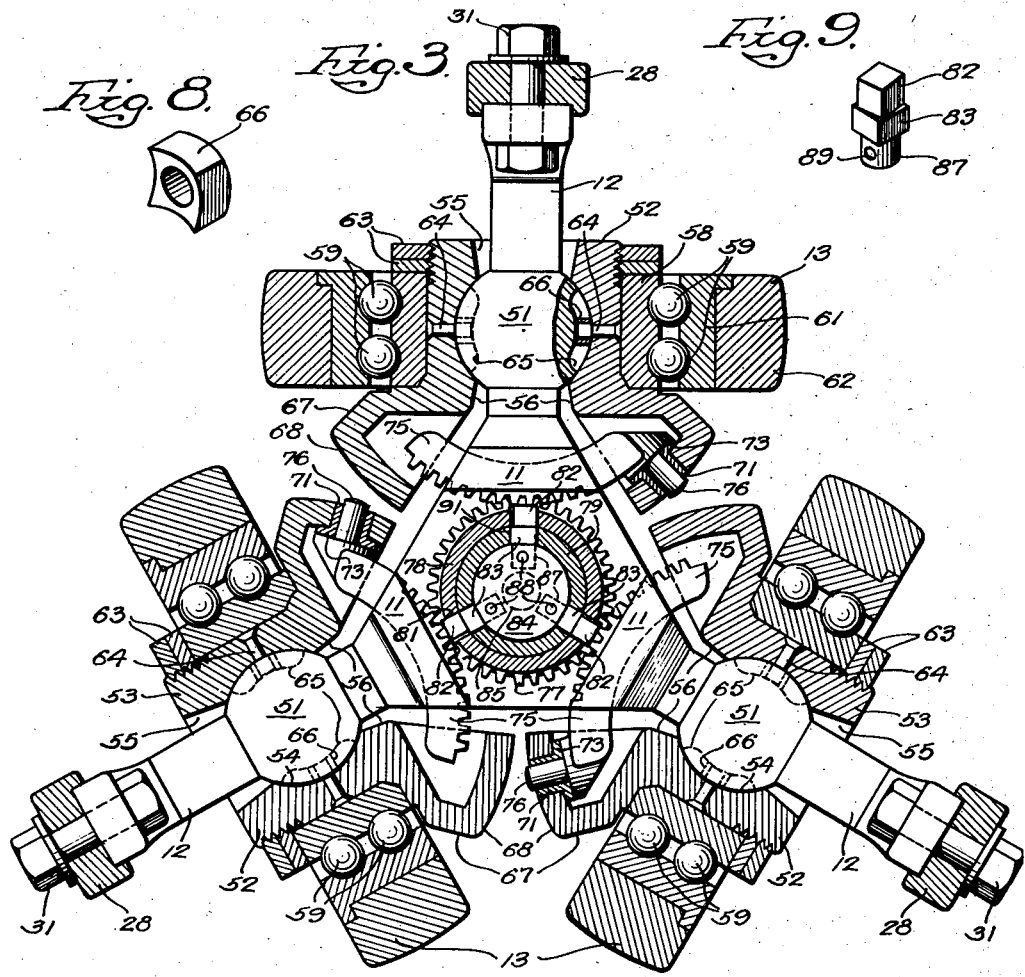
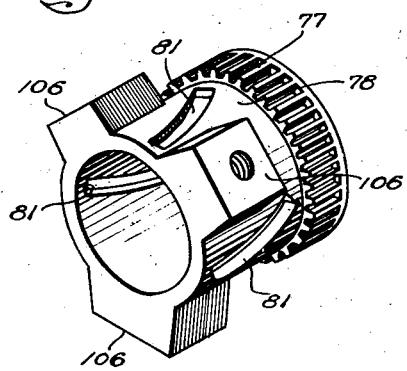
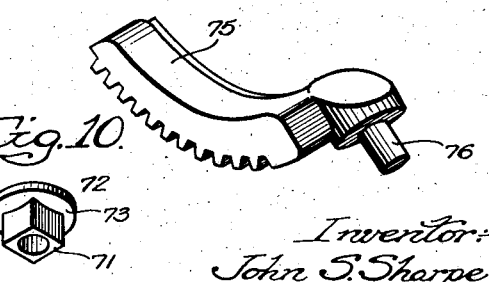
Inventor:-
John S. Sharpe
by his Attorneys
Howson & Howson Dec. 18, 1934. J. S. SHARPE 1,985,110
TRANSMISSION MECHANISM
Original Filed Aug. 13, 1932 6 Sheets-Sheet 4
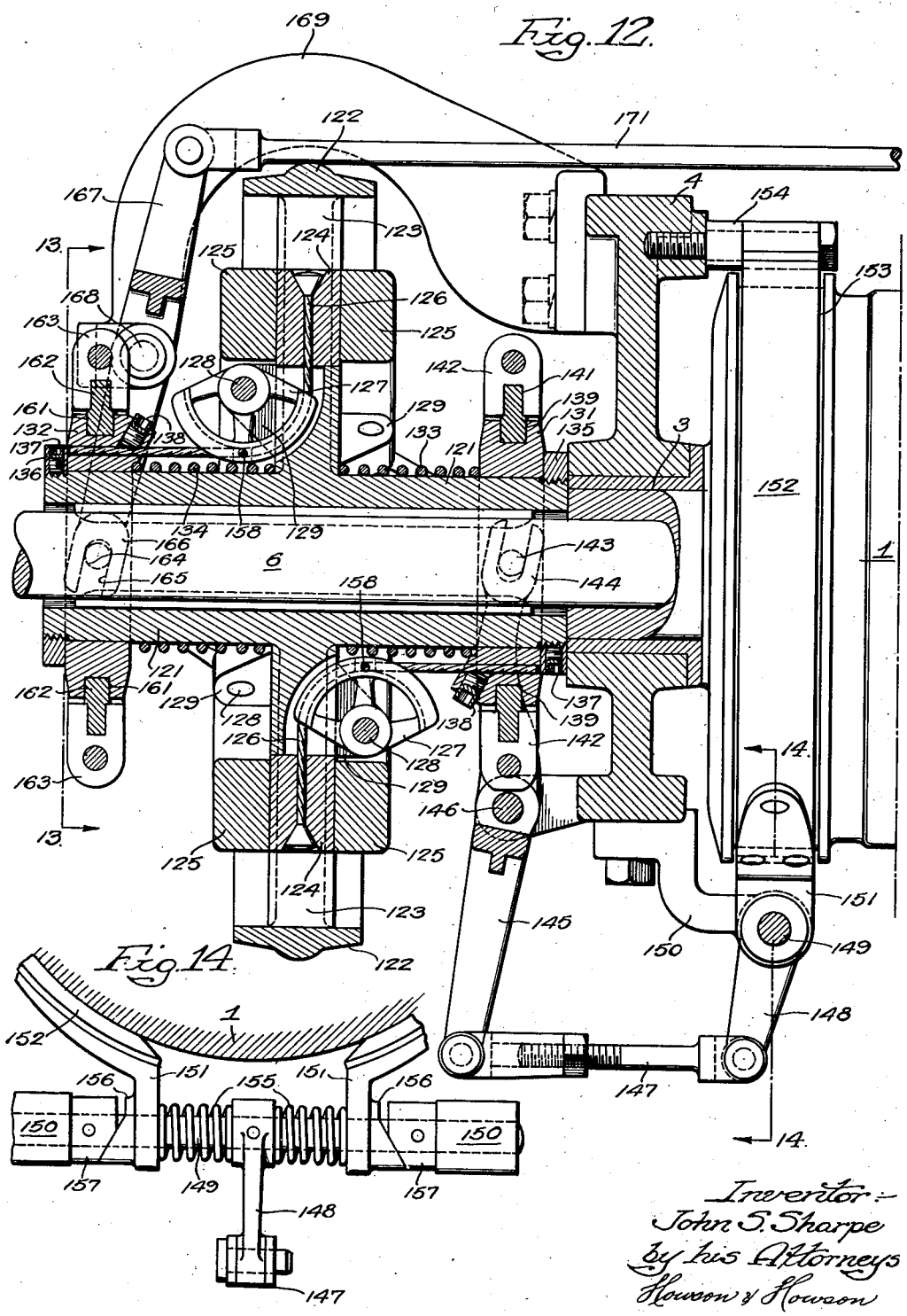

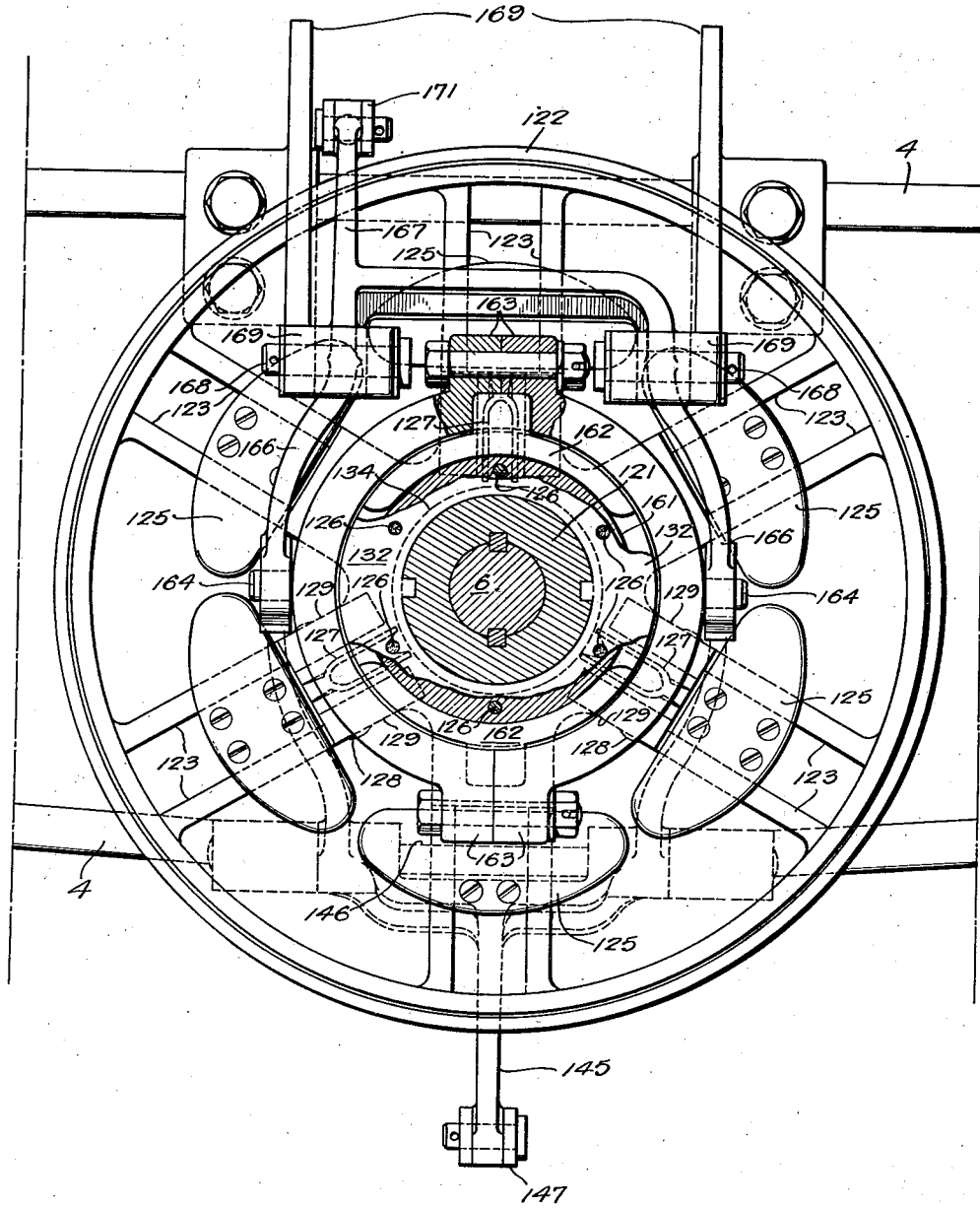

Dec. 18, 1934.   J. S. SHARPE   1,985,110
TRANSMISSION MECHANISM
Original Filed Aug. 13, 1932   6 Sheets-Sheet 6
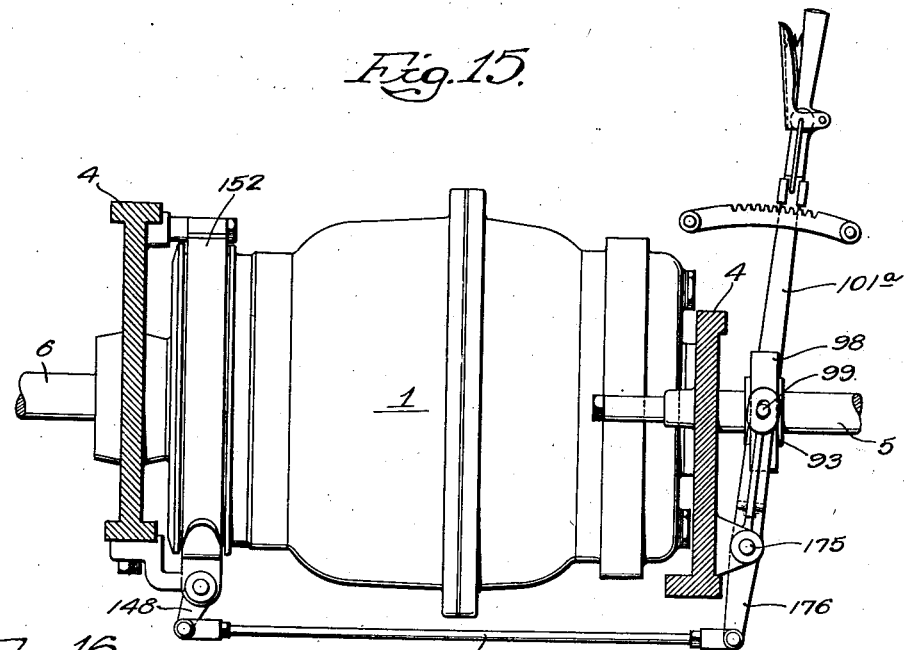
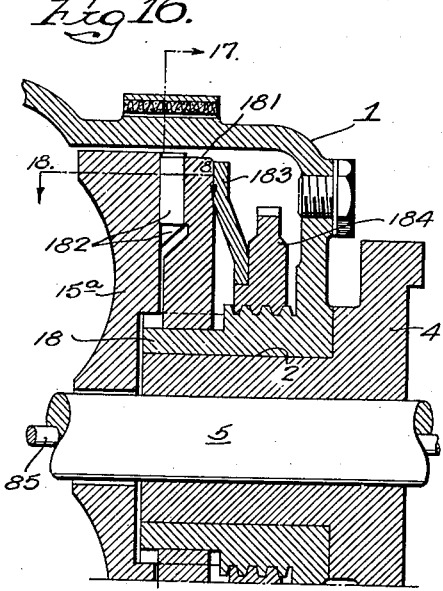
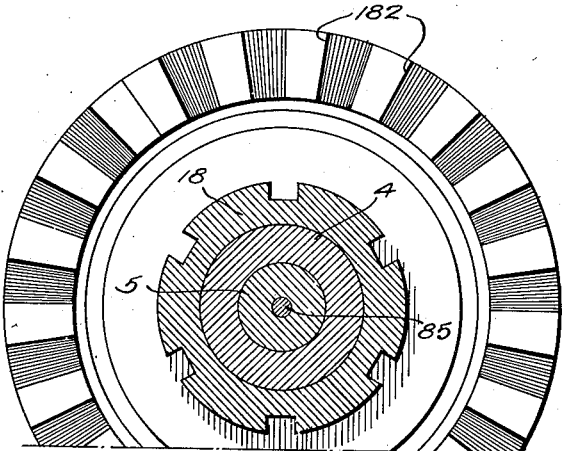
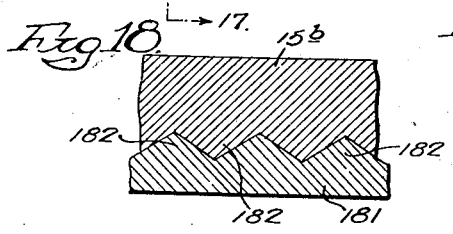
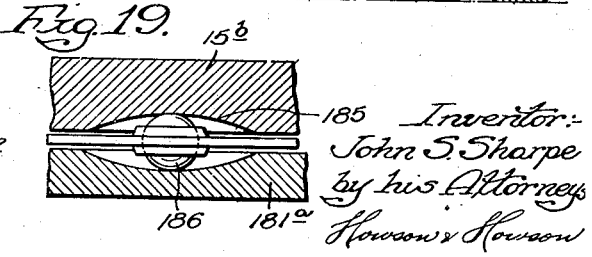

Patented Dec. 18, 1934

1,985,110

UNITED STATES PATENT OFFICE 1,985,110

TRANSMISSION MECHANISM

John S. Sharpe, Haverford, Pa.

Application August 13, 1932, Serial No. 628,721
Renewed October 20, 1933

16 Claims. (Cl. 74—281)

This invention relates to improvements in transmission mechanisms, and more particularly to improvements in that type of mechanism disclosed in my copending application Serial Number 440,755, filed April 1, 1930.

One of the objects of my invention is to provide a variable speed, variable torque transmission mechanism suitable, for example, for transmitting power from the motor of a motor vehicle to the propeller shaft wherein manual adjustments to vary the speed and torque ratios of the driving and driven shafts are avoided.

More specifically, an object of the invention is to provide a transmission mechanism of the stated character incorporating novel means for automatically varying the torque ratios of the driving and driven shafts.

The invention further resides in certain novel and improved mechanical features and structural details hereinafter set forth and illustrated in the attached drawings, in which:

Figure 1 is a longitudinal sectional view of a portion of a transmission mechanism made in accordance with my invention;

Fig. 2 is a section on the line 2—2, Fig. 1;

Fig. 3 is an enlarged transverse sectional view on the line 3—3, Fig. 1;

Fig. 4 is an elevational partial sectional view of an element of the mechanism;

Fig. 5 is a side elevational view of the element shown in Fig. 4;

Figs. 6, 7, 8, 9 and 10 are perspective views of elements of the mechanism;

Fig. 11 is an enlarged fragmentary sectional view illustrating a detail of the mechanism;

Fig. 12 is an elevational and partial sectional view illustrating the details of the governor mechanism;

Fig. 13 is a section on the line 13—13, Fig. 12;

Fig. 14 is a fragmentary sectional view taken on the line 14—14, Fig. 12;

Fig. 15 is a sectional elevation illustrating a modification within the scope of the invention;

Fig. 16 is a fragmentary sectional view illustrating a further modification within the scope of the invention;

Fig. 17 is a section on the line 17—17, Fig. 16;

Fig. 18 is a fragmentary sectional view on the line 18—18, Fig. 16, and

Fig. 19 is a fragmentary sectional view illustrating still another modification within the scope of the invention.

With reference to the drawings, a preferred embodiment of my invention comprises a casing or housing member 1 journaled for rotation on bearings 2 and 3 formed in the relatively fixed frame structure 4 of the mechanism. Also journaled in said structure 4 is a shaft 5 which is adapted for connection with a motor and which hereinafter will be termed the drive shaft, and a shaft 6 which in the present instance is shown journaled in the hub portion of the housing 1 and which constitutes the driven shaft of the mechanism.

The inner end of the drive shaft 5 carries a spider 11, see Figs. 1 and 3, this spider comprising in the present instance three radially projecting arms 12 on each of which is mounted for rotation a planetary wheel 13. The wheels 13 occupy operative positions within a torroidal space 14 formed between opposed disks 15 and 16 within the housing. The disk 15 is splined to the housing 1 as indicated at 17, Fig. 1, which permits relative movement of these interconnected parts axially of the housing, while providing that the one rotate with the other. The disk 15 bears upon the inwardly projecting hub portion 18 of the housing 1. This hub portion is externally threaded for reception of a nut 19 between which and the opposed face of the disk 15 is confined a spring 21, this spring being held under tension and exerting a pressure tending to advance the disk 15 axially towards the disk 16. Since the planetary wheels 13 bear at diametrically opposite points against the concaved faces of the disks 15 and 16, the spring 21 functions to compress the wheels between the said disks.

Surrounding the disk 16 within the housing is a ring 25, this ring as shown in Fig. 2 being composed of three segments, each segment having at its end oppositely projecting lugs 26 through which pass bolts 27 which secure the segments together. Extending transversely from the mid point of each segment of the ring 25 is an arm 28, the arms at one side of the ring being connected by a stud 29 and a bolt 31 with the radial arms 12 respectively of the spider 11. The oppositely extending arms 28 of the ring 25 are similarly connected through studs 32 and bolts 33 with radial arms 34 of a spider 35 which occupies a position intermediate the disk 16 and a disk 36 secured to the housing 1, the spider 35 being journaled on the inwardly projecting hub portion 37 of the last-named disk. Journaled for rotation on each of the arms 34 of the spider 35 is a planetary wheel 38, these wheels operating within a torroidal space 39 formed between the opposed faces of the disks 16 and 36, and said wheels contacting at diametrically opposite points with the said disks.

The disk 16 is carried by a shaft 41 which extends through and is journaled in the hollow hub 37 of the disk 36, the shaft projecting through the said disk and having fixed thereto at its outer end a pinion 42. The pinion 42 meshes with a set of planetary pinions 43 carried by a spider 44 on the inner end of the driven shaft 6, the pinions 43 also meshing with an annular gear 45 secured to the housing 1. It will be noted that the spring 21 functions through the disk 15 and the planetary wheels 13 to place the planetary wheels 38 under compression between the disks 16 and 36.

The construction and mounting of the wheels 13 and 38 is best shown in Figs. 3, 4 and 5. Each of the radial arms of the spiders 11 and 35 comprises an intermediate ball-shaped portion 51 which is embraced by a member 52 constituting the hub of the planetary wheel. The member 52 shown in Figs. 4 and 5 comprises a hollow cylindrical portion 53 having in the interior a socket 54 for reception of the ball 51 and extending from each side of the socket an opening, 55 and 56 respectively, the sides of which diverge outwardly from the said socket. The member 52 is formed as illustrated in two parts to permit assembly around the radial arm 12 and the ball 51, the two parts being relatively positioned by dowel pins 57 which project from one portion into suitable openings formed in the other. Fitting around the cylindrical portion 53 is a ring 58 which constitutes the inner race of a ball bearing 59, the outer face of which is constituted by a second ring 61. Fitted to this outer race ring 61 is an annular rim portion 62 of the planetary wheel, which as previously set forth engages the disks 15 and 16 or 16 and 36, as the case may be. The ring 58 is confined upon the cylindrical portion 53 of the member 52 by nuts 63, threaded on the outer end of the said cylindrical portion, as clearly illustrated. The arrangement is such that the members 52 have free movements upon balls 51 of the radial arms 12 or 34 with which they individually are associated, restricted only by the pins 64 which project from the surface of the socket 54 into slots 65 of the said balls, see Fig. 3, these slots 65 in each instance extending parallel to the radial arm with which they are associated. The inner projecting end of each of the pins 64 is provided in the present instance with a loose block 66 which has a flat extended bearing with the sides of the slot in which it rides. While the members 52 are thus prevented from rotating about the axes of the respective radial arms upon which they are mounted, the rim portion 62 of each of the planetary wheels is free to rotate upon the bearings 59 about this axis.

It will be noted that the pins 64 which are in alignment with each other extend on a radial line from the center of the ball 51 so that the member 52 may be freely adjusted upon the ball on an axis corresponding to the mutual axis of the pins 64. The pins 64 are also so arranged that their mutual axis intersects the points of contact between the rim 62 of the wheel and the disks between which as previously described the said wheels operate. It will be noted further that the pins 64 by reason of the slots 65 in the ball 51 into which the said pins project do not interfere with adjustment of the member 52 about an axis at right angles both to the axis of the pins 64 and the axis of the radial arm of which the ball forms a part.

For a purpose hereinafter set forth provision is made for adjusting the members 52 about an axis through the pins 64. Referring to Figs. 3, 4 and 5, it will be noted that each of the members 52 is provided at the unthreaded end of the cylindrical portion 53 and at opposite sides thereof with aprons 67, the arcuate extremities 68 of which are formed on centers corresponding with the center of the ball 51. Each of these extremities is provided with an inclined rectangular cam slot 69 within which slidably fits from the inner surface of the extremities 68 a rectangular portion 71 of a sleeve 72 shown in Fig. 10, a flange 73 engaging the inner surface of the apron extremities 68 as shown in Fig. 3. Mounted in an arcuate slot 74, see Figs. 1, 3 and 11, in the spider 11 at the base of each of the radial arms 12 of the latter is a segmental rack 75, this rack being adapted to slide longitudinally in the said slot 74 and having at one end a pin 76 which as shown in Fig. 3 enters the sleeve 72 in the adjustable member 52. The racks 75 mesh with a gear 77 on a sleeve 78, see Fig. 6, which sleeve is journaled on the inner hollow cylindrical extension 79 of the spider 11.

As shown in Fig. 6, the sleeve 78 is provided with three rectangular slots 81 which extend at an angle to the longitudinal axis of the sleeve, into which slots project the rectangular extremity 82 of a pin 83 which projects from the cylindrical head portion 84 of a rod 85, this rod extending longitudinally through the center of the shaft 5 and the spider 11 and terminating in a slot 86 formed in the shaft exteriorly of the housing 1. The cylindrical head 84 of the rod 85 is slidably fitted in the interior of the hub projection 79 of the spider 11, and this projection is longitudinally slotted for reception of the pin 83, which as previously set forth projects into the slots 81 of the sleeve 78. In the present instance, the pins 83 are provided with a cylindrical base portion 87 which enters correspondingly formed openings in the peripheral surface of the head 84, and pins 88 driven into the end of the head 4, see Fig. 3, enter apertures 89 in the cylindrical end 87 of the pins 83 and thus retain the pins fixed in the head. The rectangular intermediate portions of the pins 83 slidably fit the longitudinal slots 91 in the hub projections 79 of the spider 11.

Means is provided for longitudinally adjusting the rod 85 in the shaft 5. This means in the present instance comprises transverse projections 92 on the outer end of the rod 85 which project outwardly through the slot 86 in the shaft 5 and beyond the peripheral surface of the shaft. A split sleeve 93 embraces the shaft and has in the inner surface thereof a circumferential slot 94 into which the extremities of the arms 92 extend. The sleeve 93 also has in its outer periphery a circumferential slot 95 which receives at opposite sides of the sleeve segmental keys 96, these keys being retained in slots 97 in a ring or yoke 98 having trunnions 99 at diametrically opposite sides thereof journaled in the spaced arms of a bifurcated lever 101. This lever is pivotally mounted at 102 on the relatively fixed frame 4 of the mechanism. The aforedescribed connection provides by adjustment of the lever 101 about the pivot 102 for longitudinal adjustment of the rod 85 and also permits free rotation of the said rod with the shaft 5 with respect to the lever.

Longitudinal adjustments of the rod 85 as described above results through the pins 83 and the angularly disposed slots 81 in a rotative movement of the sleeve 78, which in turn through the gear 77 effects simultaneous longitudinal movements of the racks 75. Such longitudinal movement of the racks 75 through the medium of the pins 76 and sleeves 72 which occupy the eccentric slots 69 results in pivotal adjustment of the members 52 and the wheels 13 about an axis through the pins 64.

The sleeve 78 as shown in Fig. 6 is provided with radially projecting bosses 106, to each of which is secured by a stud 107 one end of a U-shaped strap 108, this strap extending outwardly and over the periphery of the disk 16. The other end of each of these straps is secured by studs 109 to the lugs 111 of a sleeve 112 which corresponds in all respects to the sleeve 78 and which is journaled on the inner end of the hub extension 37 of the disk 36. The gear 113 of the sleeve 112 meshes with segmental racks 114 corresponding to the racks 75 previously described and similarly mounted in the spider 35. The wheels 38 which are identical with the wheels 13 previously described are similarly mounted upon the balls 51 of the radial arms 34 of the spider 35 and are similarly related to the racks 114. A ring 115 surrounding the disk 16 is secured by screws 116 to the straps 108 and form a rigid connection therebetween. It will thus be apparent that any adjustment of the sleeve 78 through longitudinal movement of the rod 85 results in a corresponding adjustment of the sleeve 112. Adjustment of the wheels 13 about the axis of their pins 64 is thus accompanied by a corresponding adjustment of the wheels 38.

In operation of that portion of the mechanism described above and with the housing 1 immobilized by means hereinafter described, rotation of the shaft 5 and its spider 11 by the motor results also through the connecting member 25 in a corresponding rotation of the spider 35. In this rotative movement, the wheels 13 and 38 which occupy the relative positions shown in Fig. 1 will track upon the relatively fixed disks 15 and 36 and will thereby effect rotation of the disk 16 and its shaft 41. Since the annular gear 45 is immobilized with the housing 1, rotation of the shaft 41 through the pinion 42 results in an application of torque to the spider 44 tending to rotate the driven shaft 6. By reason of the inclination of the planetary wheels 38, which in the illustrated position engage the outer portion of the disk 16 and the inner portions of the disks 15 and 36, the torque applied to the shaft 41 through the planetaries is relatively great, and the planetary gear system 42, 43, 45 still further increases the torque transmitted to the driven shaft 6. The speed of the drive shaft 5, however, with respect to the speed of the driven shaft 6 is relatively high. Assuming now that the rod 85 is adjusted inwardly, there results a tilting of the wheels 13 and 38 about the axes of their respective pins 64, this tilting being in a direction effecting precessional adjustments of the wheels between their respective sets of disks about an axis as previously described through the centers of the wheels and of the balls 51 at right angles both to the axis of the pins 64 and the longitudinal axis of the radial arms 12 and 34. This precessional movement results in a shifting of the point of contact of the wheels with the disk 16 inwardly towards the axis of that disk and a corresponding movement outwardly from the axis of the points of contact of the wheels with the disks 15 and 36. This precessional movement also tends to readjust the wheels about the axis through the pins 64 to their original normal position on that axis and as soon as this position has been restored, the precessional movement is interrupted. The extent of the precessional movement, therefore, is directly controlled by the extent of the original adjustment of the wheels about the axes of their pins 64. As the precessional movement continues, the speed of the driven shaft increases with respect to the speed of rotation of the drive shaft until when the wheels occupy a position substantially the reverse of that shown in Fig. 1 the speeds of the drive and driven shafts are unity and the entire mechanism including the housing 1 tends to rotate as a unit.

It will be noted that the initial position of the wheels 13 and 38 as illustrated in Fig. 1, the points of contact between the wheels and the disk 16 are the same distance radially from the common axis of the shafts 5, 41 and 6 as the pitch circle of the annular gear 45, while the points of contact of the wheels 13 and 38 with the disks 15 and 36 respectively correspond in racial distance from the axis of the shafts with the pitch circle of the pinion 42. In the reverse positions of the wheels 13 and 38, the radial distance of the points of contact of the wheels with the disks 15 and 36 corresponds to the radius of the annular gear 45, while the points of contact of the said wheels with the disk 16 corresponds with the radius of the pitch circle of the pinion 42.

Referring now to Figs. 12, 13 and 14, it will be noted that the extension of the shaft 6 externally of the housing 1 has keyed thereto a sleeve 121, which sleeve intermediate its ends is formed with a radial flange 122, which flange has formed therein a series of radial slots 123 in each of which is mounted a block 124, to the opposite sides of which are secured weight elements 125, these weight elements overlapping the sides of the grooves and retaining the blocks 124 in position in the latter. Each of the blocks 124 has suitably anchored thereto a cable 126, each cable passing over a segmental sheave 127 pivotally mounted on pins 128 supported in bracket arms 129 projecting from the sides of the flange 122. The slots 123 are six in number, and the blocks 124 of alternate slots are connected through the cables 126 with sleeves 131 and 132 respectively slidably mounted at opposite ends of the sleeve 121. Springs 133 and 134 confined between the opposite sides of the flange 122 and the adjacent sides of the respective sleeves 131 and 132 tend to hold the latter away from the flange and in the extreme outward positions in which they are illustrated in Fig. 12, this outer position being defined by nuts 135 and 136 threaded on the extremities of the sleeve 121 and locked in position thereon by set screws 137. The cables 126 enter apertures in the sleeves 131 and 132 and are secured therein in the present instance by set screws 138.

The sleeve 131 has in its outer periphery a circumferential slot 139 which receives at opposite sides of the sleeve segmental keys 141, the outer ends of these keys projecting into slots in a split ring 142. This ring has at diametrically opposite points thereon outwardly projecting trunnions 143 which occupy slots in the outer ends of the arms 144 of a bifurcated lever 145, this lever being pivotally mounted at 146 on the fixed frame 4 of the mechanism. A link 147 connects the lower end of the lever 145 with an arm 148 on a shaft 149 journaled in a bracket 150 secured to the frame 4. The shaft 149 passes through apertures in the terminal lugs 151 of a brake band 152 which embraces a drum 153 on the end of the housing 1, this band being supported at its mid position upon a stud 154 threaded into the frame 4. Springs 155 confined between the hub of the arm 148 and the inner faces of the lugs 151 tend to force the latter apart and thereby release the brake band from the drum. Each of the lugs carries on its outer face a cam 156 which functionally cooperate with reverse cams 157 secured to the shaft 149 to force the lugs 151 toward each other to thereby tighten the brake band on the drum.

In the position illustrated in Fig. 14, the cams 157 have been adjusted to force the ends of the brake band together to thereby set the brake. Adjustment of the lever 145 in a counterclockwise direction, see Fig. 12, effects a movement of the cams 157 with respect to the cams 156, releasing the ends of the brake drum and permitting the springs 155 to separate the lugs 151 and thereby release the brake. Such counterclockwise movement of the lever 145 is effected by action of those of the weights 125 connected with the sleeve 131 outwardly of the guide slots 123, this movement of the weights occurring when the angular velocity of the driven shaft 6 and of the sleeve 121 secured thereto has reached a predetermined point. In the present instance, the cables 126 are secured at 158 to the sheave 127 whereby movement of the cable necessarily and positively results in a rotative movement of the sheave 127. As the weights move outwardly, therefore, the sheave is rotated in a counterclockwise direction, see Fig. 12, that end of the sheave adjacent the sleeve 131 thus being withdrawn from the path of the latter. By this means the space between the sleeve and the flange 125 may be reduced to a minimum without interference between the sheave and the sleeve in their adjustment movements. It will be noted that with the weights positioned as shown in Figs. 12 and 13, the brake band 152 is closed upon the drum 153 whereby the housing 1 is immobilized. This seating of the brake upon the drum is effected through the medium of the spring 133.

As previously set forth, the other series of alternate weights 125 is connected through their respective cables 126 with the sleeve 132. This sleeve has in its outer periphery a circumferential slot 161 occupied at opposite sides of the sleeve by a pair of segmental keys 162, the outer projecting portions of these keys being confined in slotted openings in a ring 163 embracing the sleeve. The ring 163 has at diametrically opposite points thereof outwardly projecting trunnions 164 which enter slots 165 in the terminal ends of the arms 166 of a bifurcated lever 167, this lever being pivotally secured at 168 to a bracket arm 169 secured to the frame 4. The upper end of the lever 167 is connected through a rod 171 with the free end of the lever 101 through which as previously described adjustment of the rod 85 is effected. With the weights 125 positioned as shown in Figs. 12 and 13, the rod 85 occupies the position illustrated in Fig. 1. When, however, the weights 125 move outwardly by centrifugal action as the velocity of the driven shaft reaches a predetermined point, the sleeve 132 is drawn to the right, see Fig. 12, which shifts the levers 167 and 101 in the counterclockwise direction and thereby effects an inward movement of the rod 85 in the shaft 5. As previously set forth, this inward movement of the rod 85 effects a precessional adjustment of the wheels 13 and 38 from the low speed position shown in Fig. 1 to the high speed position, this adjustment being completed only when the driven shaft 6 has reached a predetermined angular velocity. In the application of the foregoing transmission mechanism to a motor vehicle, this angular velocity corresponds to the minimum rotative speed of the drive shaft 5 within the direct drive speed range of the motor.

It will now be noted that in the low speed or starting position of the mechanism as illustrated in Figs. 1 and 12, the brake 152 is applied, thereby immobilizing the housing member 1 and permitting application of torque through the planetary wheels 13 and 38 and the planetary gears 43 from the drive shaft to the driven shaft. As the speed of the driven shaft increases, this condition prevails until such time as the wheels 13 and 38 in their precessional movement reach the direct drive position, at which time the brake 152 is released, thereby permitting the housing 1 to rotate with the associated rotating parts in the direct drive relation between the drive and driven shafts. Decrease in the angular velocity of the driven shaft 6 below a predetermined minimum determined by the mass of the weights 125 results in a movement of said weights inwardly and a corresponding automatic precessional movement of the wheels 13 and 38 in the opposite direction and toward the low speed position and also in a resetting of the brake 152, immobilizing the housing 1.

In Fig. 15, I have illustrated a modification of the mechanism described above wherein the centrifugal brake-controlling mechanism has been eliminated and wherein the adjustment of the planetary transmission elements is effected by hand, as also is the application of the clutch or brake 152. In this instance, the ring or yoke 98 is operatively connected to a hand lever 101a, which lever is pivoted at 175 and has a depending extension 176 below the pivot. This extension is connected through a rod 177 with the actuating lever 148 of the brake 152. The arrangement is such that when the lever 101a approaches the high speed position, the brake 152 is automatically locked, the result being as previously described.

It will be noted that in the embodiment shown in Fig. 1 the elements 15 and 16 are pressed against the planetary wheels 13 and 38 through the medium of the leaf spring 21 and adjusting nut 19, this arrangement affording a substantially constant pressure upon the wheels 13 and 38. In some instances, it may be desirable to provide means for increasing the pressure of the elements 15 and 16 upon the planetary wheels at the moments when the power requirements are relatively great. This may be accomplished as shown in Figs. 16, 17 and 18, by connecting the element 15a corresponding to the element 15 of the aforedescribed embodiment with the casing 1 through the medium of a member 181 splined to the inwardly projecting hub portion 18 of the housing and bearing against the outer face of the element 15a. The abutting faces of this latter element and of the member 181 may be formed as illustrated in Figs. 17 and 18 with intermeshing cam-like projections 182, and a spring 183 adjustable through the medium of an adjusting nut 184 is provided to resiliently hold the member 181 against the base of the element 15a. When with a device of this character the power demand upon the mechanism is greatest, the element 181 splined to the housing will tend to move circumferentially with respect to the member 15a, such relative movement resulting in an increased axial pressure upon the member 15a tending to force it towards the planetary wheels which it contacts. In this way, the pressure upon the wheels is made proportionate to the power demand upon the mechanism.

Instead of the inclined faces shown in Fig. 18, the elements 15a and 181 may be provided with recesses 185 in their opposed faces, within which may be located a ball or roller 186, any relative movement of the elements 15b and 181a resulting in an axial separation of these elements through the medium of the ball 186. There may be other devices of this general character capable of providing the desired result.

I claim:

1. The combination with a planetary driven member, of a pair of coaxial rotary elements engaging opposite sides of said planetary member, a planetary driving member operative through one of said elements to exert a driving torque of predetermined magnitude upon said driven member and a lesser driving torque upon said driven member through the other of said elements, means for immobilizing the last-named element, means operatively associated with the driving member for progressively decreasing and increasing said driving torques respectively to a condition of substantial balance wherein the said elements and the driven member tend to rotate as a unit in the same direction, and means for synchronously operating said immobilizing means and said torque-decreasing and increasing means.

2. The combination with a planetary driven member, of a pair of coaxial rotary elements engaging opposite sides of said planetary member, a planetary driving member operative through both of said elements to exert driving torques upon said driven member, means associated with one of said planetary members for progressively and relatively varying the driving torques exerted through said elements between a predetermined condition of unbalance and a condition of substantial balance wherein the said elements and members tend to rotate as a unit in the same direction, releasable means for immobilizing that one of said elements through which the lesser driving torque is exerted, and a common actuator for said immobilizing means and said torque-varying means.

3. The combination with a planetary driven member, of a pair of coaxial rotary elements engaging opposite sides of said planetary member, a planetary driving member operative through both of said elements to exert driving torques upon said driven member, means associated with one of said planetary members for progressively and relative'y varying the driving torques exerted through said elements between a predetermined condition of unbalance and a condition of substantial balance wherein the said elements and members tend to rotate as a unit in the same direction, releasable means for immobilizing that one of the said elements through which the lesser driving torques is exerted, and centrifugally operated actuating means for said immobilizing means and said torque-varying means operatively associated with said driven member.

4. The combination with a planetary driven member, of a pair of coaxial rotary elements engaging opposite sides of said planetary member, a planetary driving member operative through both of said elements to exert driving torques upon said driven member, means associated with one of said planetary members for progressively and relatively varying the driving torques exerted through said elements between a predetermined condition of unbalance and a condition of substantial balance wherein the said elements and members tend to rotate as a unit in the same direction, releasable means for immobilizing that one of the said elements through which the lesser driving torque is exerted, and an actuator for said immobilzing means and said torque-varying means, said actuator comprising a radial guide carried by the driven member, a weight movable in said guide, resilient means normally retaining said weight in a retracted position, and means operatively connecting said weight with said immobilizing and torque-varying means, said weight being movable to an extended position against the pressure of said retaining spring by centrifugal action set up by rotation of the driven member.

5. The combination with a planetary driven member, of a pair of coaxial rotary elements engaging opposite sides of said planetary member, a planetary driving member operative through both of said elements to exert driving torques upon said driven member, means associated with one of said planetary members for progressively and relatively varying the driving torques exerted through said elements between a predetermined condition of unbalance and a condition of substantial balance wherein the said elements and members tend to rotate as a unit in the same direction, releasable means for immobilizing that one of the said elements through which the latter driving torque is exerted, and an actuator for said immobilizing and said torque-varying means, said actuator comprising a sleeve fixed to the driven shaft, a cross head axially movable on said sleeve, a weight guided for radial movement in said sleeve and connected with said cross head, spring means normally retaining the weight and said cross head means in a retracted position, and means for operatively connecting said cross head means with said immobilizing and torque-varying means, said weight being adapted to move into an extended position by centrifugal action set up by rotation of the driven member.

6. The combination with a planetary driven member, of a pair of coaxial rotary elements engaging opposite sides of said planetary member, a planetary driving member operative through both of said elements to exert driving torques upon said driven member, means associated with one of said planetary members for progressively and relatively varying the driving torques exerted through said elements between a predetermined condition of unbalance and a condition of substantial balance wherein the said elements and members tend to rotate as a unit in the same direction, means for immobilizing that one of said elements through which the lesser driving torque is exerted, and means automatically operative to release and apply said immobilizing means respectively when the said planetary members approach and recede from said condition of substantial balance.

7. The combination with a planetary driven member, of a pair of coaxial rotary elements engaging opposite sides of said planetary member and adapted for rotation with the latter as a unit in one direction, means for exerting a driving torque of predetermined magnitude upon said member through one of said elements and a lesser driving torque upon said member through the other of said elements, means for immobilizing said last-named element, planetary rolling adhesion means for progressively decreasing and increasing said driving torques respectively to a condition of substantial balance wherein the said elements and members tend to rotate as a unit in the same direction, and means operative automatically as said driving torques approach said condition of substantial balance for releasing said immobilizing means.

8. The combination with a planetary driven member, of a pair of coaxial rotary elements engaging opposite sides of said planetary member and adapted for rotation with the latter as a unit in one direction, means for exerting a driving torque of predetermined magnitude upon said member through one of said elements and a lesser driving torque upon said member through the other of said elements, means for immobilizing said last-named element, planetary rolling adhesion means for progressively decreasing and increasing said driving torques respectively to a condition of substantial balance wherein the said elements and members tend to rotate as a unit in the same direction and for subsequently readjusting said driving torques to the original condition of unbalance, and means operative automatically when the said driving torques approach the said condition of substantial balance for releasing said immobilizing means and for reapplying the immobilizing means when the driving torques recede from said condition of balance.

9. The combination with oppositely arranged coaxial rotary members defining a torroidal space therebetween, of a third coaxial member rotatable intermediate the members first named and having a substantially spherical portion movable in a path corresponding substantially to the circular axis of said torroidal space, a planetary wheel operative in said space and having rolling engagement with the space defining members, said spherical portion constituting a bearing for said wheel upon which the latter is adjustable to vary the relative distances from the axis of said members of the points of contact between the wheel and said members, and means for tilting said wheel upon the spherical bearing about an axis intersecting said points of contact to thereby obtain an automatic adjustment of said wheel as set forth.

10. The combination with oppositely arranged coaxial rotary members defining a torroidal space therebetween, of a third coaxial member rotatable intermediate the members first named and having a substantial spherical portion movable in a path corresponding substantially to the circular axis of said torroidal space, a planetary wheel operative in said space and having rolling engagement with the space-defining members, said wheel having a relatively fixed hub element embracing said spherical portion as a bearing upon which said head element is adjustable to vary the relative distances from the axis of said members of the points of contact between the wheel and said members, and means for adjusting said hub element upon the spherical bearing to effect a tilting of said wheel about an axis intersecting said points of contact to thereby obtain an automatic adjustment of the wheel varying the relative positions of said points of contact as set forth.

11. The combination with oppositely arranged coaxial rotary members defining a torroidal space therebetween, of a third coaxial member rotatable intermediate the members first named and having a substantially spherical portion movable in a path corresponding substantially to the circular axis of said torroidal space, a planetary wheel operative in said space and having rolling engagement with the space defining members, said wheel comprising a relatively fixed hub element embracing said spherical portion as a bearing, interengaging means upon said hub element and the spherical portion for preventing rotation of said hub element with the wheel, said interengaging means permitting adjustment of said hub element upon the spherical portion to effect a variation of the relative distances from the axis of the rotary members of the points of contact between the wheel and said members and also an adjustment of said hub element effecting a tilting of the wheel about an axis intersecting said points of contact, and means for effecting the last-named adjustment of said hub element upon the spherical portion to thereby effect a resultant automatic adjustment of the wheel affecting the relative positions of the said points of contact.

12. The combination with oppositely arranged coaxial rotary members defining a torroidal space therebetween, of a third coaxial member rotatable intermediate the members first named and having a substantially spherical portion movable in a path corresponding substantially to the circular axis of said torroidal space, a planetary wheel operative in said space and having rolling engagement with the space-defining members, said wheel comprising a relatively fixed hub element embracing said spherical portion as a bearing, interengaging means upon said hub element and the spherical portion for preventing rotation of said hub element with the wheel, said interengaging means permitting adjustment of said hub element upon the spherical portion to effect a variation of the relative distances from the axis of the rotary members of the points of contact between the wheel and said members and also an adjustment of said hub element effecting a tilting of the wheel about an axis intersecting said points of contact, and means for effecting the last-named adjustment of said hub element upon the spherical portion to thereby effect a resultant automatic adjustment of the wheel affecting the relative positions of the said points of contact, said adjusting means comprising a rack and pinion mounted on said third coaxial member, and means operatively connecting said rack with said hub element.

13. The combination with oppositely arranged coaxial rotary members defining a torroidal space therebetween, of a third coaxial member rotatable intermediate the members first named and having a substantially spherical portion movable in a path corresponding substantially to the circular axis of said torroidal space, a planetary wheel operative in said space and having rolling engagement with the space-defining members, said wheel comprising a relatively fixed hub element embracing said spherical portion as a bearing, interengaging means upon said hub element and the spherical portion for preventing rotation of said hub element with the wheel, said interengaging means permitting adjustment of said hub element upon the spherical portion to effect a variation of the relative distances from the axis of the rotary members of the points of contact between the wheel and said members and also an adjustment of said hub element effecting a tilting of the wheel about an axis intersecting said points of contact, and means for effecting the last-named adjustment of said hub element upon the spherical portion to thereby effect a resultant automatic adjustment of the wheel affecting the relative positions of the said points of contact, said adjustment means comprising a rack and pinion mounted on said third coaxial member, a cam slot in said hub element, and a pin projecting from said rack into said slot.

14. A transmission mechanism comprising driving and driven elements, and planetary mechanisms operatively associated respectively with said elements and with each other and jointly constituting a reduction gearing connecting said elements, said mechanisms being mounted for joint rotation with the driving and driven elements as a unit, releasable means for immobilizing a member of each of said mechanisms against rotation in at least one direction, means for adjusting said mechanism to vary the torque and speed ratios of the driving and driven elements, and centrifugally-operated actuating mechanism for said immobilizing and adjusting means operatively associated with the driven element.

15. A transmission mechanism comprising driving and driven elements, and planetary mechanisms operatively associated respectively with said elements and with each other and jointly constituting a reduction gearing connecting said elements, said mechanisms having a member in common and both mechanisms inclusive of said common member being mounted for joint rotation with the driving and driven elements as a unit, means for controlling the rotation of said member, means for adjusting said mechanism to vary the torque and speed ratios of the driving and driven elements, and centrifugally-operated mechanism associated with the driven element for operating said control and adjusting means.

16. A transmission mechanism comprising driving and driven elements, and planetary mechanisms operatively associated respectively with said elements and with each other and jointly constituting a reduction gearing connecting said elements, said mechanisms having a member in common and both mechanisms inclusive of said common member being mounted for joint rotation with the driving and driven elements as a unit, means for controlling the rotation of said member, means for adjusting said mechanism to vary the torque and speed ratios of the driving and driven elements, and mechanism controlled by the speed of rotation of the driven element for synchronously actuating said control and adjusting means.

JOHN S. SHARPE.